UNITED STATES PATENT OFFICE.

ADRIAAN LOUIS DE STÜRLER, OF OVERVEEN, NEAR HAARLEM, NETHERLANDS.

PROCESS OF PRESERVING FRUITS, &c.

SPECIFICATION forming part of Letters Patent No. 694,301, dated February 25, 1902.

Application filed August 15, 1900. Serial No. 26,987. (No specimens.)

*To all whom it may concern:*

Be it known that I, ADRIAAN LOUIS DE STÜRLER, chemist, a subject of the Queen of the Netherlands, residing at 262 Zylweg, Overveen, near Haarlem, in the Kingdom of the Netherlands, have invented certain new and useful Improvements Relating to the Preservation of Fruit, Vegetables, Meat, Eggs, and other Like Perishable Substances, of which the following is a specification.

This invention relates to the preservation of vegetables, fruit, meat, eggs, and other perishable substances, either for storage or transit.

Hitherto in the preservation of foods, particularly fruit or meat destined for transit, it has been usual to inclose them in wrappers or coverings, which in the case of meat consist of muslin, the foods being enveloped in this manner with the object of protecting them from the injurious effects of germs or bacteria contained in the air. This method has not, however, been found satisfactory or reliable, as the substances treated are often found unfit for human food or in an unmarketable condition after transit, thus often causing serious loss.

The object of my invention is to treat foods externally in such manner that they shall be preserved for storage in transit for a much longer time than has hitherto generally been possible, and thus enable many kinds of foods, such as perishable fruits, to be transported long distances by sea or land and delivered in a perfectly fresh condition.

According to my invention the surface of the food or substance to be preserved is first treated with a sterilizing medium—such, for instance, as sulfurous acid, formic aldehyde, or boracic acid—by which the surface of the food or substance is both sterilized and protected from the deleterious action of the germs contained in the air. The food or substance is then closely enveloped in a wrapper of paper, cotton cellulose, muslin, or similar material, which has also been sterilized by impregnation with the sulfurous acid, formic aldehyde, boracic acid, or other suitable solution. This wrapper must envelop the food or substance as closely as possible, so as to exclude air from the surface of the said food or substance. The food or substance inclosed in the wrapper is then coated with or inclosed in a covering of heavy hydrocarbon, such as paraffin or other mineral grease or wax or spermaceti. This hydrocarbon covering may be applied to all kinds of foods which are not too delicate for such treatment by rapidly dipping the food enveloped in the wrapper in a bath of the said hydrocarbon heated to a temperature of about 40° to 80° centigrade, the temperature varying according to the class of food it is required to preserve.

I claim—

1. The method of preserving food which consists in treating the surface of the food with a gaseous sterilizing agent, then closely enveloping the sterilized food in a paper cover so as to leave no space between the cover and food for the collection of gas or moisture, and then dipping the said cover containing the food into a bath of waxy hydrocarbon whereby the food is effectively sealed from the atmosphere and the hydrocarbon is prevented from coming into contact with the food, substantially as described.

2. The method of preserving food which consists in treating the surface of the food with formaldehyde gas, then closely enveloping the food in a paper cover so as to leave no space between the surface of the food and the cover for the collection of moisture or gas, then dipping the paper cover containing the food into liquid paraffin-wax and permitting it to cool, whereby the sterilized food is sealed from the atmosphere and the paper cover prevents the flavor or smell of petroleum affecting the food, substantially as described.

3. The herein-described method of preserving foods, which consists of the following steps in the order named, first, sterilizing the surface of the food, then closely enveloping the sterilized food in a sterilized wrapper causing said wrapper to snugly embrace the food and exclude the air from between the food and wrapper and then inclosing said wrapper and food in a covering of heated heavy hydrocarbon substantially as described.

In testimony whereof I have hereunto set my hand, in presence of two subscribing witnesses, this 31st day of July, 1900.

ADRIAAN LOUIS DE STÜRLER.

Witnesses:
W. EDWARD LAKE,
WALTER J. SKERTEN.